Dec. 19, 1933.   J. BLUMENFELD   1,940,620
PROCESS OF DEHYDRATING MAGNESIUM AND SIMILAR CHLORIDES
Filed Jan. 13, 1930
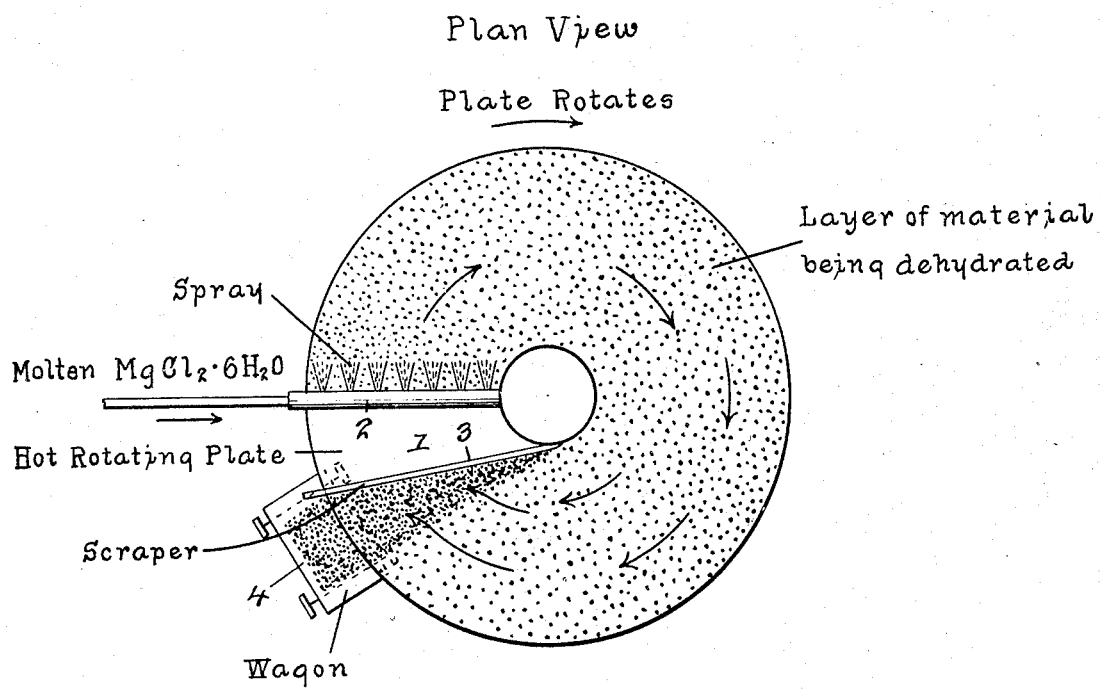
Inventor
Joseph Blumenfeld
By A. B. Foster.
Attorney Patented Dec. 19, 1933

1,940,620

UNITED STATES PATENT OFFICE 1,940,620

PROCESS OF DEHYDRATING MAGNESIUM AND SIMILAR CHLORIDES

Joseph Blumenfeld, Neuilly-sur-Seine, France, assignor to Societe de Produits, Chimiques des Terres Rares, Paris, France Application January 13, 1930, Serial No. 420,571, and in France January 18, 1929

7 Claims. (Cl. 23—91)

It is a recognized fact that one of the chief difficulties in the electrolytic manufacture of metals such as magnesium, cerium and other metals of the cerium group, consists in the preparation of a chloride which is sufficiently anhydrous and is sufficiently free from oxides and oxychlorides in order that the electrolytic operation will take place in proper conditions.

The present invention has for its object the conversion of the hydrated chloride into a partially dehydrated state, and it consists in quickly driving off a large part of the water present in the hydrated chloride by a sudden rise of temperature due to its contact with a wall or surface heated to a suitable temperature, for instance 450° C. The invention embraces the treatment of the hydrated chlorides of the metals noted above.

It further embraces a preliminary purifying of the chloride whereby it will be given a composition furthering the obtainment of the porous structure such as is necessary for the subsequent heating operation.

By way of example, the said process will be disclosed in the present description with reference to the accompanying drawing which represents a diagrammatic plan view of an apparatus which can be used for dehydrating purposes, the process being described in the treatment of magnesium chloride.

I proceed in the first place with the preparing and the purifying of the raw material, by eliminating certain substances which prevent it from being converted into a solid mass which is porous and is difficultly friable.

In the present embodiment of the invention, I employ a raw material consisting of an impure oxide or carbonate of magnesium, which is found in the market and contains some 3 per cent of calcium, estimated as CaO:MgO.

The preparation of this carbonate is not a part of my present invention, but I may mention that it may be obtained by the treatment of dolomite. As a starting material, I also may use natural magnesium chloride or natural magnesia.

The raw material, such as magnesium carbonate or magnesia, is first converted into chloride by the action of hydrochloric acid. The resulting chloride (or the natural chloride) is then purified as follows. This operation constitutes the first step of the present process.

I add to the chloride solution (if desired after an oxidation) magnesia or magnesium carbonate in excess; this is heated for a time. I thus eliminate various metals such as iron, aluminium etc., as well as silica, phosphoric acid etc. The precipitates are separated by filtering or the like.

The solution is then concentrated, and it is cooled in order to effect a partial crystallization of the magnesium in the cold state in the form of $MgCl_2: 6H_2O$. The crystals are separated from the mother liquor, for example and preferably, by centrifugal treatment, followed by washing with water, and these operations can be repeated upon the first mother liquors and then upon all the others which are successively obtained. I thus obtain the magnesium chloride in the crystallized state, which contains only the desired proportion of $CaCl_2$.

I have ascertained that the complete elimination of calcium chloride will produce a substance which is too friable. The pieces in fact become crushed into a powdery mass, and the gaseous hydrochloric acid can escape only with difficulty, through a thick layer of this substance. On the other hand, an excessive proportion of calcium chloride must not be present, for this would prevent the proper operation of the dehydration and also the subsequent use of the anhydrous chloride.

To obtain proper results in the conditions of treatment to be further disclosed, it is preferable to have present 0.05 to 0.5 per cent (and preferably between 0.1 and 0.2 per cent) of calcium chloride, represented by CaO: MgO.

In the second operation I treat the so prepared, sufficiently pure, hydrated chloride in crystals or in the melted state, in order to convert it into a partly dehydrated chloride, having a suitable structure and composition. For this purpose, it is subjected to the sudden action of a relatively high temperature such as 400°-500° C. for some minutes. The chloride is projected upon a heating table which has been brought to a temperature of 450° C. and whose heat capacity is considerable with reference to that of the mass of the chloride under treatment. The crystals melt rapidly, and the mass boils and becomes dry, leaving upon the heating table a plate of solid chloride having a porous structure. The operation is terminated in a few minutes (5 to 10 minutes for a temperature of 450° C. with a layer having a thickness of 5 to 15 mm.), and this operation should be rapid in order to prevent excessive formation of oxide and oxychloride by decomposition.

In a preferred method, I first remove a portion of water from the crystallized chloride, in a preliminary heating step, and the partly dehydrated and melted chloride is poured by a distributing device, on the heating table.

There is observed a solidifying of the thin layer of magnesium chloride in contact with the surface heated to 450° C. and the rest of the layer becomes dehydrated and solidified in a progressive manner. Due to this sudden rise of temperature, the water of crystallization is disengaged, and the mass is thus given a porous structure of an intimate nature. After the operation, the chloride has the form of a plate whose thickness varies between 5 and 15 mm. and whose mean percentage composition is as follows if the operation has been performed under the aforesaid conditions:

| | |
|---|---|
| Basic value (as MgO) | 7 to 10 |
| Chloride (as $MgCl_2$) | 86 to 80 |
| $H_2O$ | 7 to 10 |
| $Cl_2Ca$ (as CaO:MgO) | 0.1 to 0.2 |

This product, due to its fine porous structure and to the composition above indicated, is adapted for treatment in the final step of dehydration by gaseous hydrochloric acid.

The treatment with gaseous HCl is best conducted at temperatures only slightly below the temperature at which the magnesium chloride would soften, which would happen only at somewhat higher temperatures than used in the preceding step (400° to 500° C.). This treatment can be carried out by causing a gentle flow of HCl gas up through a bed of the solidified $MgCl_2$, say in a vertical tower, in which the temperature at the bottom is about 600°–620° C., and at the top is about 400°–450° C., said tower being externally heated in any desired way, say electrically.

The gaseous HCl serves a double purpose, it reacts with the MgO present to form $MgCl_2$ and it carries away the small amount of water still present in the chloride.

In certain cases, the product after the first heating step may be used in manufacture without the said hydrochloric acid treatment for dehydration.

This is for instance the case with chlorides of the cerium earths, which can be directly used in the partly dehydrated state as raw material for the electrolytic manufacture of cerium, either alone or with the addition of anhydrous chloride.

The operation of partial dehydration is performed in good conditions by the use of the following plant:

The hydrated chloride is treated upon a heating table provided with suitable heating means. For large plants, it may have the form of a circular disk which is given a continuous or intermittent rotation (or an endless belt can be used) this being combined with a loading device such as a hopper, and with removing means, for instance a scraper.

In the apparatus shown in the drawing, the table consists of a circular disk 1 below which are disposed the heating means (not shown). The hydrated chloride which, for instance in the case in which it contains six molecules of water, melts at 113° C. is supplied in the hot and liquid state by a main conduit 2 pierced with orifices such as slots, rows of holes etc., spaced upon the whole width of the table, so that the latter will be sprinkled upon the entire width.

Upon the surface of the table is disposed a stationary scraper 3 which automatically detaches the plates of chloride in the partly dehydrated and porous state and discharges them upon a truck 4 or other removing means.

The speed of motion of the heating surface is so regulated that the time in which the material remains between the feeding and the discharge devices will suffice for the proper conversion of the chloride as herein disclosed.

I claim:

1. Process for the partial dehydration of chlorides of magnesium, of cerium and earths of the cerium class, which are subject to decomposition by heating, which consists in treating the chloride containing water by a sudden heating by contact with a surface heated to a temperature of about 400°–500° C.

2. Process for the partial dehydration of chlorides of magnesium, of cerium and earths of the cerium class, which are subjected to decomposition by heating, which consists in treating the chloride containing water by a sudden heating by contact with a surface heated to about 400° to 500° C., to effect the sudden disengagement of water, thus giving the substance a porous structure, and treating the latter with HCl gas, while hot, but not molten.

3. In a process claimed in claim 1, the obtainment of the intermediate chloride which is partly dehydrated by pouring, on a surface maintained at a temperature of about 450° C., the magnesium chloride in the melted state.

4. In a process of treating hydrated chlorides of the kind which by heating sufficiently to effect complete dehydration, decompose with liberation of hydrochloric acid, the step of placing a layer of said hydrated chlorides, having a thickness of 5 to 15 m.m. upon a surface heated to about 400° to 500° C., for 5 to 10 minutes, to effect a partial dehydration while converting the chlorides into a porous mass.

5. In the treatment of hydrated magnesium chloride by the process claimed in claim 1, the obtainment of the intermediate chloride which is partly dehydrated by contact with a surface maintained at a temperature of about 450° C. for about 5 to 10 minutes, whereby a porous partly dehydrated magnesium chloride is obtained, after which said chloride is removed from said surface in order to prevent excessive formation of oxychlorides.

6. In the process claimed in claim 1, the obtainment of the intermediate partly dehyrated chloride by a preliminary heating for expelling a first portion of the water of chrystallization, and then distributing said partly dehydrated chloride on a surface maintained at a temperature of about 450° C., for obtaining the intermediate chloride.

7. The process of treating magnesium chloride crystals which comprises melting these crystals in their water of crystallization and heating the liquid thereby produced, sufficiently to drive off a substantial portion of the water in the molten mass, depositing the remaining liquid, as a thin layer on a surface heated to about 450° C., and maintaining this condition for about 5 to 10 minutes, whereby the greater part of the water is driven out and a porous mass results, subjecting the product to heat in an atmosphere containing hydrochloric acid gas, until sufficiently dehydrated.

JOSEPH BLUMENFELD.